US012578804B1

(12) United States Patent
Yang et al.

(10) Patent No.: US 12,578,804 B1
(45) Date of Patent: Mar. 17, 2026

(54) BATTERY-REPLACEABLE KEYBOARD

(71) Applicant: Primax Electronics Ltd., Taipei (TW)

(72) Inventors: Shao-Wei Yang, Taipei (TW); Yi-Hsien Lin, Taipei (TW); Chang-En Sun, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 19/179,463

(22) Filed: Apr. 15, 2025

(30) Foreign Application Priority Data

Mar. 3, 2025 (TW) ................................. 114107714

(51) Int. Cl.
*G06F 3/02* (2006.01)
*G06F 3/0354* (2013.01)

(52) U.S. Cl.
CPC ........ *G06F 3/0202* (2013.01); *G06F 3/03547* (2013.01)

(58) Field of Classification Search
CPC ............................ G06F 3/0202; G06F 3/03547
See application file for complete search history.

(56) References Cited

U.S. PATENT DOCUMENTS

| | | | | |
|---|---|---|---|---|
| 9,218,020 | B1* | 12/2015 | Martinez | G06F 1/1656 |
| 10,019,029 | B1* | 7/2018 | Yu | H05K 7/1417 |
| 10,585,518 | B2* | 3/2020 | Huston | G06F 1/1626 |
| 2004/0124104 | A1* | 7/2004 | DeVolpi | G06F 3/0202 |
| | | | | 206/320 |

| | | | | |
|---|---|---|---|---|
| 2005/0035950 | A1* | 2/2005 | Daniels | G06F 3/0219 |
| | | | | 345/169 |
| 2014/0146445 | A1* | 5/2014 | Lai | G06F 3/0213 |
| | | | | 361/679.1 |
| 2016/0196936 | A1* | 7/2016 | Ding | G06F 3/0202 |
| | | | | 361/679.09 |
| 2019/0355994 | A1* | 11/2019 | Lee | H01M 10/0431 |
| 2023/0289000 | A1* | 9/2023 | Liu | G06F 3/03547 |
| 2025/0240515 | A1* | 7/2025 | Baker | H04N 23/631 |

FOREIGN PATENT DOCUMENTS

| | | | | | | |
|---|---|---|---|---|---|---|
| CN | 110688019 | A | * | 1/2020 | .......... | G06F 1/1662 |
| JP | 05341706 | A | * | 12/1993 | | |
| KR | 20060099290 | A | * | 9/2006 | .......... | G06F 1/1618 |
| KR | 101128104 | B1 | * | 3/2012 | ........ | G06F 3/04886 |
| KR | 20140001622 | U | * | 3/2014 | .......... | H01H 13/83 |

* cited by examiner

*Primary Examiner* — Temesghen Ghebretinsae
*Assistant Examiner* — Karin Kiyabu
(74) *Attorney, Agent, or Firm* — KIRTON McCONKIE; Evan R. Witt

(57) ABSTRACT

The present invention provides a battery-replaceable keyboard, which includes a keyboard frame, a cover plate and a lower plate structure. The keyboard frame has a recessed portion configured to accommodate a battery. The cover plate is disposed beneath the keyboard frame and has a first through opening exposing the recessed portion. The lower plate structure is configured to be detachably attached to a lower surface of the cover plate, and includes a base plate, a reworkable adhesive layer and a protective plate. The reworkable adhesive layer is disposed on the base plate and has a second through opening corresponding to the first through opening. The protective plate is disposed in the second through opening.

10 Claims, 6 Drawing Sheets

110

BATTERY-REPLACEABLE KEYBOARD

FIELD OF THE INVENTION

The present invention relates to a battery-replaceable keyboard.

BACKGROUND OF THE INVENTION

In some keyboards on the market, a lithium battery is enclosed in a housing in a fully sealed manner. If the battery is to be replaced, the housing must be destroyed, which will cause the keyboard to be damaged and unusable.

SUMMARY OF THE INVENTION

The present invention provides a battery-replaceable keyboard, which includes a keyboard frame, a cover plate and a lower plate structure. The keyboard frame has a recessed portion configured to accommodate a battery. The cover plate is disposed beneath the keyboard frame and has a first through opening exposing the recessed portion. The lower plate structure is configured to be detachably attached to a lower surface of the cover plate, and includes a base plate, a reworkable adhesive layer and a protective plate. The reworkable adhesive layer is disposed on the base plate and has a second through opening corresponding to the first through opening. The protective plate is disposed in the second through opening.

In some embodiments of the present invention, the protective plate is configured to completely cover the battery.

In some embodiments of the present invention, a thickness of the protective plate is greater than a thickness of the reworkable adhesive layer.

In some embodiments of the present invention, the reworkable adhesive layer and the protective plate are separated from each other.

In some embodiments of the present invention, when the lower plate structure is detachably attached to the lower surface of the cover plate, the protective plate is in contact with an edge of the recessed portion.

In some embodiments of the present invention, when the lower plate structure is detachably attached to the lower surface of the cover plate, the protective plate and the cover plate are laterally adjacent to and separated from each other.

In some embodiments of the present invention, when the lower plate structure is detachably attached to the lower surface of the cover plate, the reworkable adhesive layer is adhered to the cover plate.

In some embodiments of the present invention, the base plate includes a substrate; and an outer cover layer disposed beneath the substrate.

In some embodiments of the present invention, when the lower plate structure is detachably attached to the lower surface of the cover plate, a minimum thickness of the keyboard is less than or equal to 6 mm.

BRIEF DESCRIPTION OF THE DRAWINGS

Aspects of the present invention are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
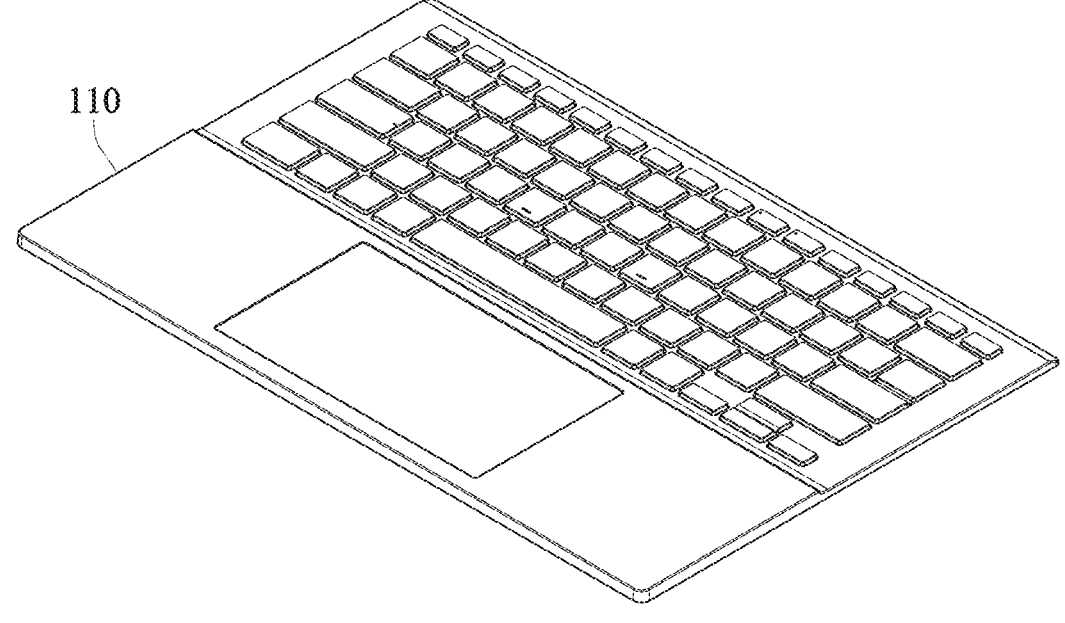
FIG. 1 is a perspective view of a battery-replaceable keyboard according to an embodiment of the present invention.

The advantages and features of the present invention and the method for achieving the same will be described in more detail with reference to exemplary embodiments and accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in the prior art, in some keyboards on the market, a lithium battery is enclosed in a housing in a fully sealed manner. If the battery is to be replaced, the housing must be destroyed, which will cause the keyboard to be damaged and unusable. Accordingly, the present invention provides a battery-replaceable keyboard, which includes a keyboard frame, a cover plate and a lower plate structure, in which the lower plate structure includes a base plate, a reworkable adhesive layer and a protective plate. The lower plate structure is configured to be detachably attached to a lower surface of the cover plate, so if the battery needs to be replaced, the lower plate structure can be disassembled. The keyboard will not be damaged during the disassembling of the lower plate structure. After replacing the battery, the lower plate structure can be attached back to the lower surface of the cover plate. Various embodiments of the battery-replaceable keyboard of the present invention will be described in detail below.

Figure 2:
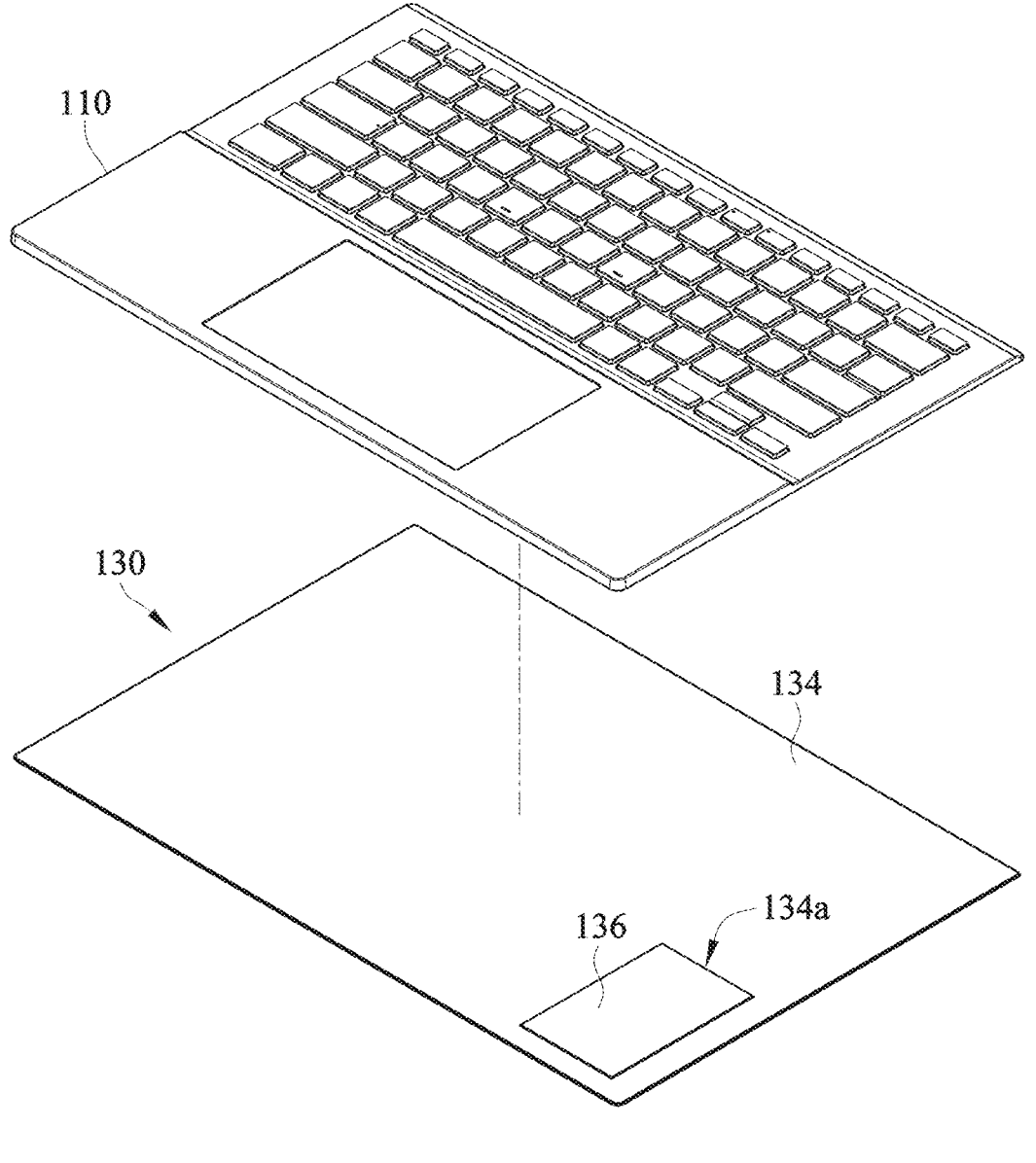
FIG. 2 is a perspective exploded view of the battery-replaceable keyboard of FIG. 1.
Figure 3:
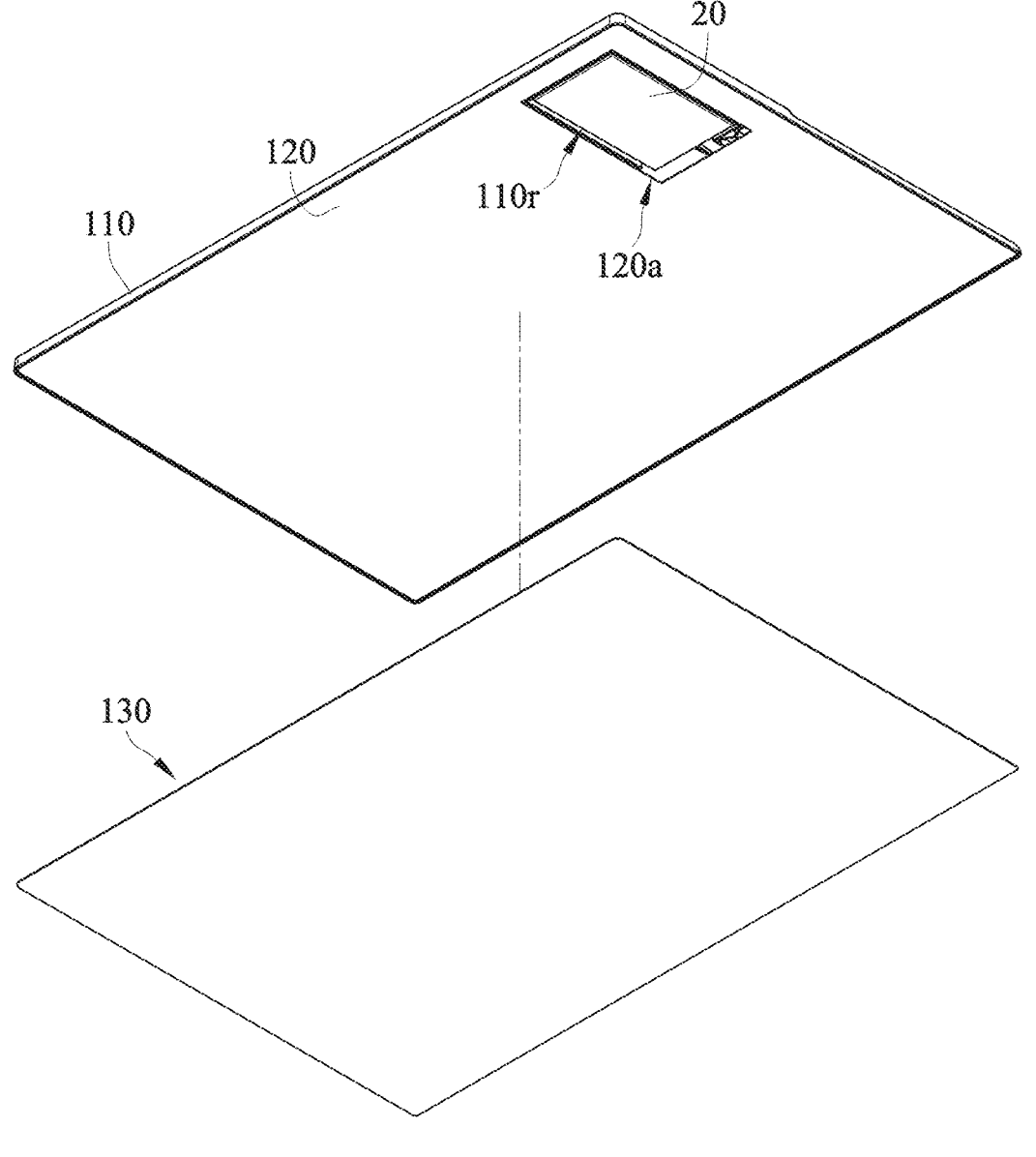
FIG. 3 is a perspective exploded view of the battery-replaceable keyboard of FIG. 1 from another perspective view.
Figure 4:
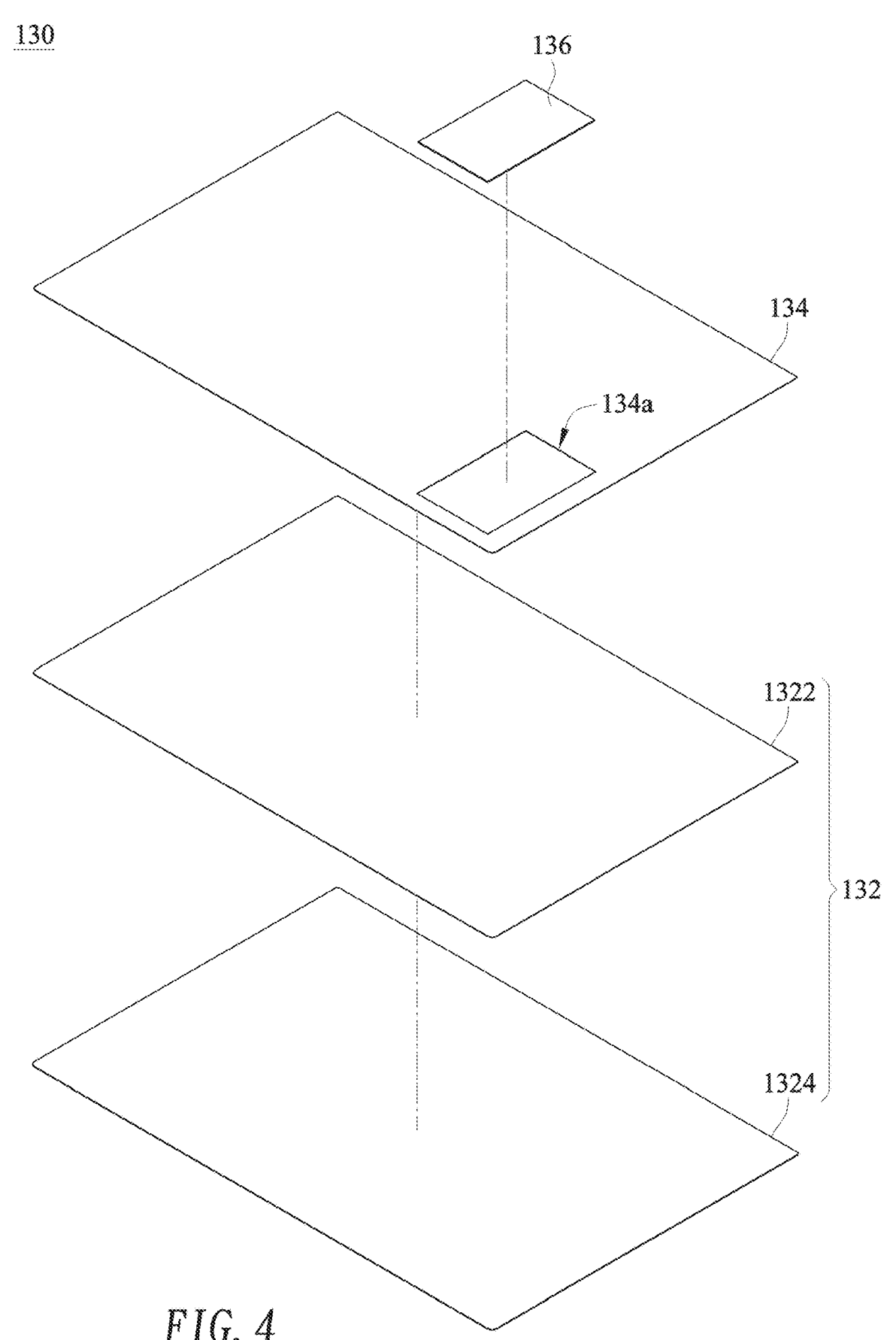
FIG. 4 is a perspective exploded view of a lower plate structure of FIG. 2.
Figure 5:
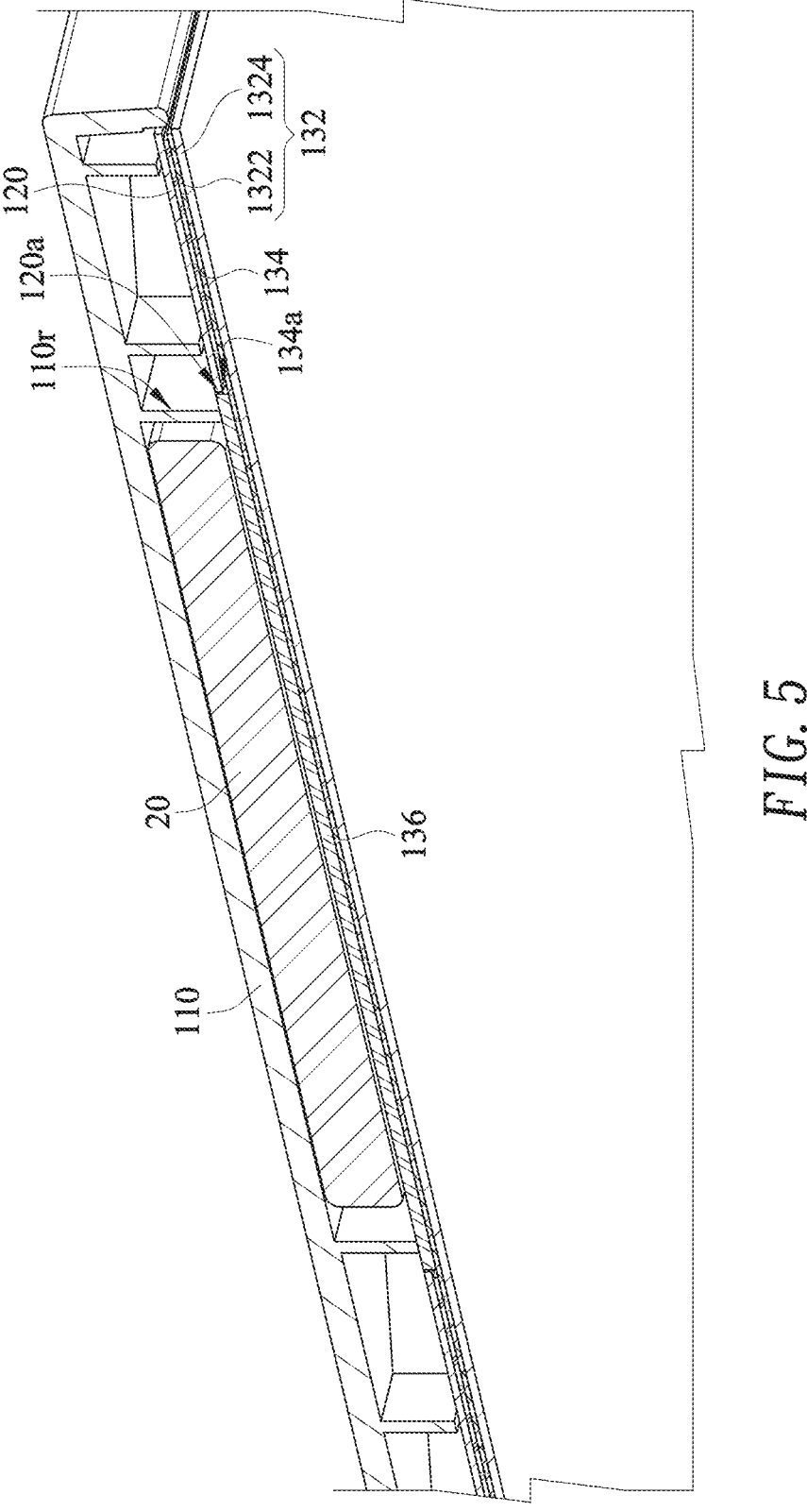
FIG. 5 is a partial cross-sectional view of the battery-replaceable keyboard of FIG. 1.
Figure 6:
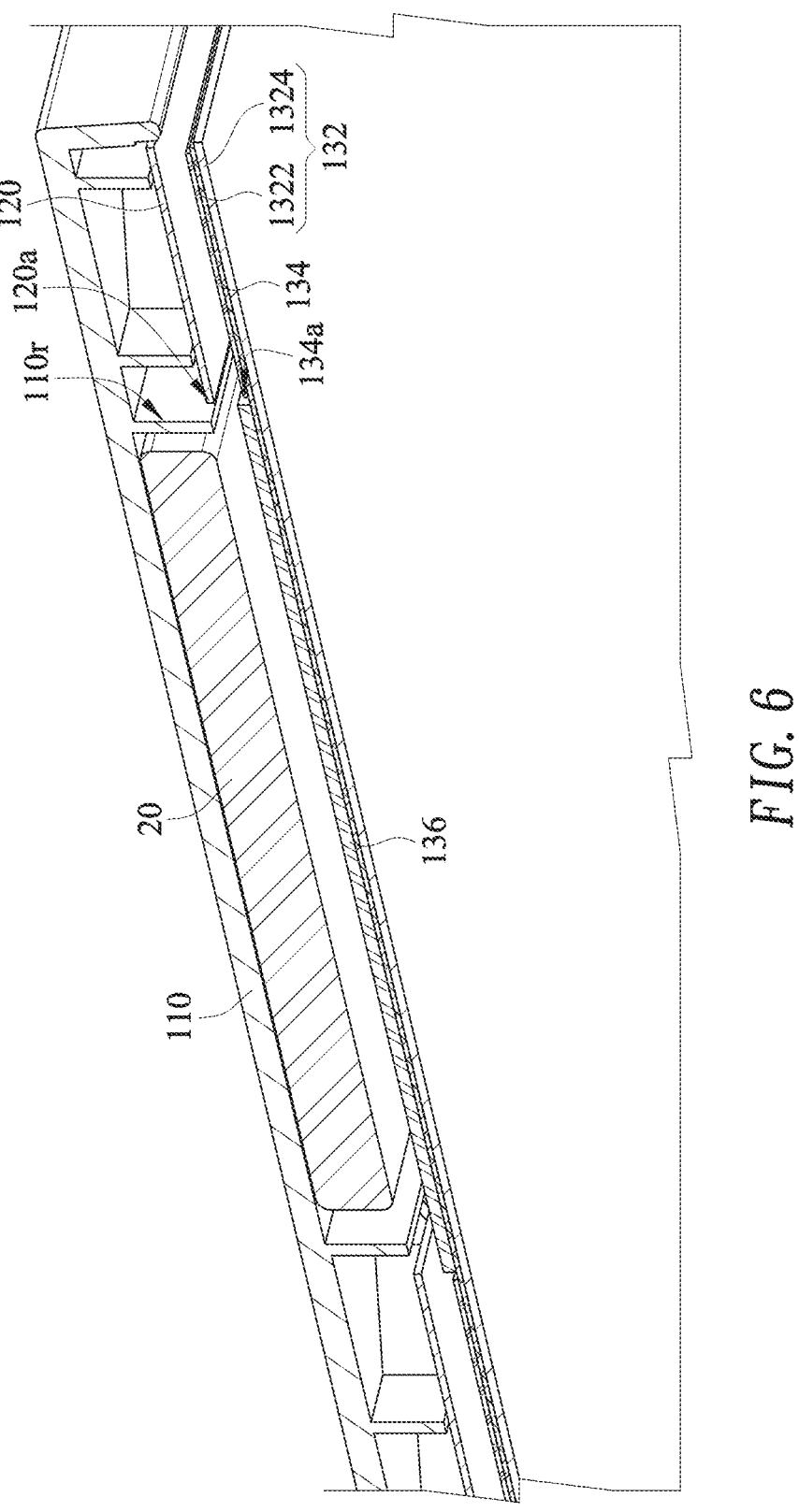
FIG. 6 is a partial cross-sectional view of the battery-replaceable keyboard of FIG. 5 after a lower plate structure is disassembled.

FIG. 1 is a perspective view of a battery-replaceable keyboard according to an embodiment of the present invention. FIG. 2 is a perspective exploded view of the battery-replaceable keyboard of FIG. 1. FIG. 3 is a perspective exploded view of the battery-replaceable keyboard of FIG. 1 from another perspective view. FIG. 4 is a perspective exploded view of a lower plate structure of FIG. 2. FIG. 5 is a partial cross-sectional view of the battery-replaceable keyboard of FIG. 1. FIG. 6 is a partial cross-sectional view of the battery-replaceable keyboard of FIG. 5 after a lower plate structure is disassembled. As shown in FIGS. 1 to 6, the keyboard includes a keyboard frame 110, a cover plate 120 and a lower plate structure 130.

As shown in FIGS. 3 and 5, the keyboard frame 110 has a recessed portion 110*r* configured to accommodate a battery 20. In some embodiments, as shown in FIGS. 1 and 2, the keyboard further includes a keyboard module (not labeled). In some embodiments, the keyboard frame 110 further has a plurality of through openings (not labeled), which are configured to respectively expose keycaps (not labeled) of key structures of the keyboard module. In some embodiments, as shown in FIGS. 1 and 2, the keyboard further includes a touchpad module (not labeled). In some embodiments, the keyboard frame 110 further has another through opening (not labeled) configured to expose an upper cover plate (not labeled) of the touchpad module.

As shown in FIGS. 3, 5 and 6, the cover plate 120 is disposed beneath the keyboard frame 110 and has a first through opening 120*a* that exposes the recessed portion 110*r*. In some embodiments, the cover plate 120 is partially fixed below the keyboard frame 110. In some embodiments, the keyboard module is disposed between the cover plate 120 and the keyboard frame 110 and within the aforementioned through openings. In some embodiments, the touchpad module is disposed between the cover plate 120 and the keyboard frame 110 and in the aforementioned other through opening.

As shown in FIGS. 2 to 5, the lower plate structure 130 is configured to be detachably attached to the lower surface of the cover plate 120. As shown in FIG. 4, the lower plate structure 130 includes a base plate 132, a reworkable adhesive layer 134 and a protective plate 136.

In some embodiments, as shown in FIG. 4, the base plate 132 includes a substrate 1322 and an outer cover layer 1324, and the outer cover layer 1324 is disposed beneath the substrate 1322. In some embodiments, the substrate 1322 is a glass fiber board (e.g., an FR4 board) or a resin substrate (e.g., a PET substrate). In some embodiments, the outer cover layer 1324 is cloth, genuine leather, synthetic leather, or microfiber leather. However, the present invention is not limited to the aforementioned embodiments.

As shown in FIGS. 2 to 5, the reworkable adhesive layer 134 is disposed on the base plate 132 and has a second through opening 134*a* corresponding to the first through opening 120*a*. In some embodiments, the reworkable adhesive layer 134 is a reworkable double-sided adhesive layer that is easy to tear. In some embodiments, as shown in FIG. 5, the reworkable adhesive layer 134 is adhered to the base plate 132. In some embodiments, the reworkable adhesive layer 134 is adhered to the substrate 1322 of the base plate 132. In some embodiments, when the lower plate structure 130 is detachably attached to the lower surface of the cover plate 120, the reworkable adhesive layer 134 is adhered to the cover plate 120.

As shown in FIGS. 2, 4 and 5, the protective plate 136 is disposed in the second through opening 134*a*. In some embodiments, the protective plate 136 is configured to completely cover the battery 20 to prevent the battery 20 from being squeezed and deformed. In some embodiments, as shown in FIG. 5, a thickness of the protective plate 136 is greater than a thickness of the reworkable adhesive layer 134. In some embodiments, the protective plate 136 is fixed on the base plate 132. In some embodiments, the protective plate 136 is fixed on the base plate 132 by an adhesive (not shown). In some embodiments, the protective plate 136 is fixed on the substrate 1322 of the base plate 132. In some embodiments, the reworkable adhesive layer 134 and the protective plate 136 are separated from each other. In some embodiments, the protective plate 136 is a glass fiber board (e.g., an FR4 board) or a carbon fiber plate. In other embodiments, the protective plate and the base plate are integrally formed (not shown).

In some embodiments, as shown in FIG. 5, when the lower plate structure 130 is detachably attached to the lower surface of the cover plate 120, the protective plate 136 is in contact with an edge of the recessed portion 110*r*. In some embodiments, when the lower plate structure 130 is detachably attached to the lower surface of the cover plate 120, the protective plate 136 and the cover plate 120 are laterally adjacent to and separated from each other. In some embodiments, when the lower plate structure 130 is detachably attached to the lower surface of the cover plate 120, a minimum thickness of the keyboard is less than or equal to 6 mm.

Referring to FIGS. 5 and 6, the user can remove the lower plate structure 130 from the cover plate 120 by hand. After the lower plate structure 130 is disassembled, the battery 20 can be replaced. In some embodiments, after the lower plate structure 130 is disassembled, the reworkable adhesive layer 134 can be torn off and a new reworkable adhesive layer 134 can then be attached. After replacing the battery 20, the lower plate structure 130 can be attached back to the lower surface of the cover plate 120. During the above procedure of replacing the battery 20, the keyboard will not be damaged.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not intended to limit the scope of claims of the present invention.

What is claimed is:

1. A battery-replaceable keyboard, comprising:
a keyboard frame, having a recessed portion configured to accommodate a battery;
a cover plate, disposed beneath the keyboard frame and having a first through opening exposing the recessed portion; and
a lower plate structure, configured to be detachably attached to a lower surface of the cover plate, and comprising:
a base plate;
a reworkable adhesive layer, disposed on the base plate and having a second through opening corresponding to the first through opening; and
a protective plate, disposed in the second through opening.

2. The keyboard of claim 1, wherein the protective plate is configured to completely cover the battery.

3. The keyboard of claim 1, wherein a thickness of the protective plate is greater than a thickness of the reworkable adhesive layer.

4. The keyboard of claim 1, wherein the reworkable adhesive layer and the protective plate are separated from each other.

5. The keyboard of claim 1, wherein when the lower plate structure is detachably attached to the lower surface of the cover plate, the protective plate is in contact with an edge of the recessed portion.

6. The keyboard of claim 1, wherein when the lower plate structure is detachably attached to the lower surface of the cover plate, the protective plate and the cover plate are laterally adjacent to and separated from each other.

7. The keyboard of claim 1, wherein when the lower plate structure is detachably attached to the lower surface of the cover plate, the reworkable adhesive layer is adhered to the cover plate.

8. The keyboard of claim 1, wherein the base plate comprises:

a substrate; and an outer cover layer, disposed beneath the substrate.

9. The keyboard of claim 1, wherein the protective plate is fixed on the base plate.

10. The keyboard of claim 1, wherein when the lower plate structure is detachably attached to the lower surface of the cover plate, a minimum thickness of the keyboard is less than or equal to 6 millimeters (mm).

* * * * *